Aug. 28, 1934. W. R. WEEKS 1,971,667
METHOD OF AND APPARATUS FOR TREATING SHEET RUBBER
Filed March 26, 1931 2 Sheets-Sheet 1
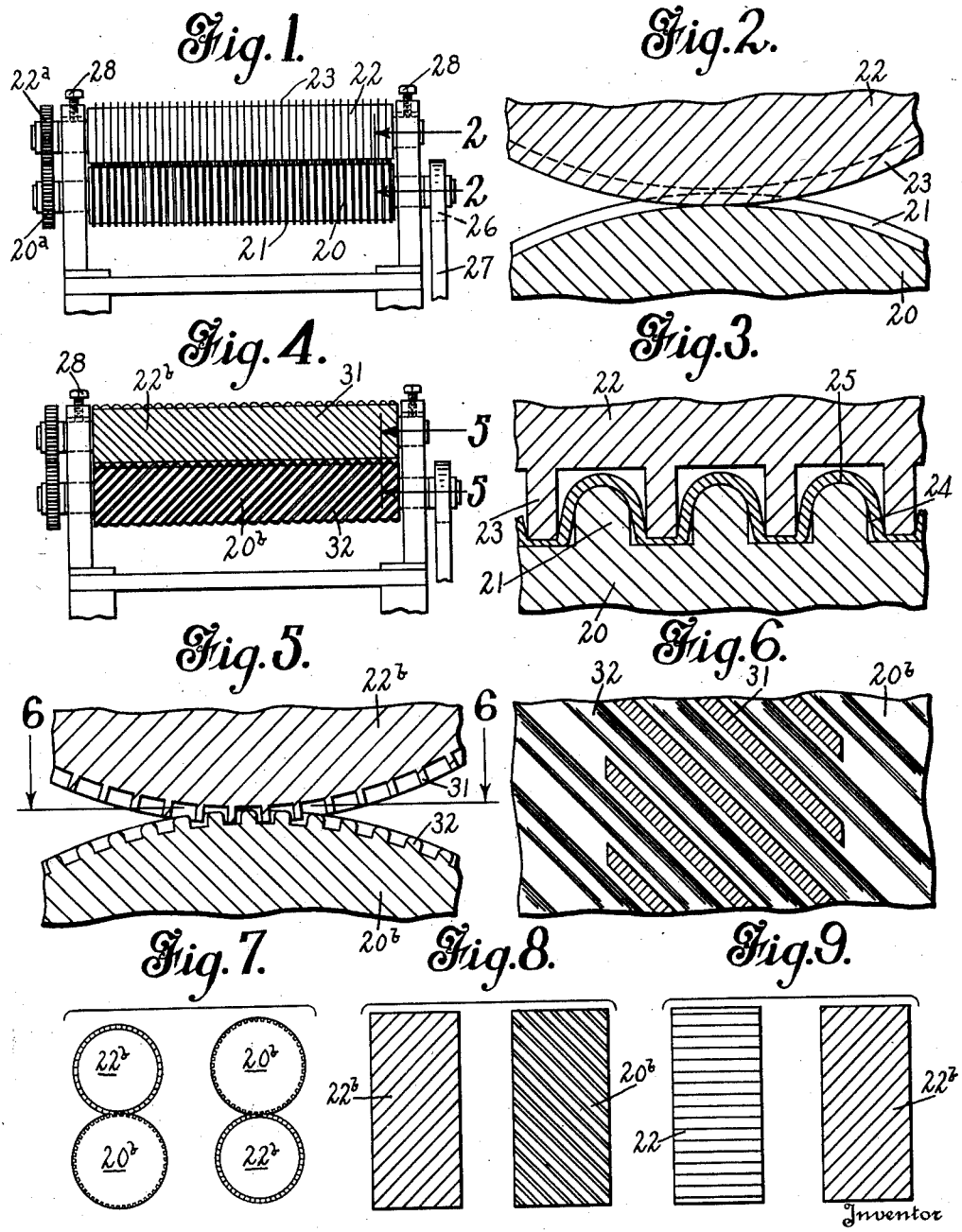

Patented Aug. 28, 1934

1,971,667

UNITED STATES PATENT OFFICE 1,971,667

METHOD OF AND APPARATUS FOR TREATING SHEET RUBBER

Walter R. Weeks, Hamden, Conn., assignor to The Seamless Rubber Company, Incorporated, New Haven, Conn.

Application March 26, 1931, Serial No. 525,389

27 Claims. (Cl. 18—19)

This invention relates to methods of and apparatus for ornamenting sheet rubber by crinkling or puckering the sheet. The finished sheet usually has a multiplicity of small protuberances and depressions at each face thereof, and is particularly adapted for the manufacture of bathing caps and similar articles.

One of the main objects which I have in view is the provision of an improved method and an improved apparatus for producing material of this character.

Another object is to provide an apparatus which is effective in producing a well-crinkled sheet of rubber having an attractive appearance.

To these and other ends the invention consists in the novel features and steps and combinations of parts to be hereinafter described and claimed.

In the accompanying drawings:

Fig. 1 is an elevation of apparatus for carrying out my new method, involving a pair of coacting rolls having right-angularly disposed ribs;

Fig. 2 is an enlarged section on line 2—2 of Fig. 1;

Fig. 3 is a fragmentary longitudinal section through adjacent portions of the two rolls on a scale even larger than Fig. 2;

Fig. 4 is a view similar to Fig. 1 showing a modified form of apparatus in which the rolls are provided with helically disposed coacting ribs;

Fig. 5 is an enlarged section on line 5—5 of Fig. 4;

Fig. 6 is a fragmentary section on line 6—6 of Fig. 5 on an even larger scale than Fig. 5;

Fig. 7 is a somewhat diagrammatic side elevation showing two pairs of rolls arranged in tandem;

Figs. 8 and 9 are diagrammatic plan views, respectively, of the apparatus shown in Fig. 7, and a further modified form of apparatus.

Figure 10:
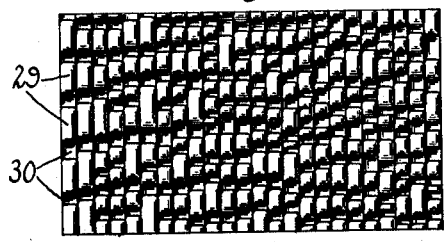
Figs. 10 to 17, inclusive, are views showing different forms of the product.

By my novel method I mold or form the rubber of the unvulcanized sheet along a plurality of parallel lines so as to produce a plurality of inverted channels which are molded in the sheet over longitudinally arcuate or curved forms (usually on the circumference of a roll) so that the tops or intermediate connecting portions of the inverted channels are of greater length than the rest of the sheet, and, when the sheet is flattened out, form themselves into a multiplicity of alternating protuberances and depressions.

Preferably the rubber is molded over a plurality of forms constituted by ribs on the surface of a suitable roll, and in the spaces between the ribs of this roll the rubber is compressed so that along the parallel lines of pressure the sheet is held during the molding over the tops of the ribs on the roll, and so that along such lines of pressure at or adjacent the bases of the ribs the material of the sheet will be shorter than it is at the summits of the ribs. Preferably the ribs have transversely curved upper surfaces so that the molded channels above referred to are of substantially U-shape. Preferably also the means for exerting pressure upon the sheet between the molding ribs is constituted by a plurality of pressure ribs upon a mating roll, which press the material against the first roll along a plurality of parallel short lines, while upon longer lines the rubber is molded over the curved surfaces of the molding ribs of said first roll.

In Figs. 1, 2 and 3 of the drawings, 20 is a lower roll having molding ribs 21, which in this instance are annular ribs right-angularly disposed with respect to the axis of the roll; and 22 is a coacting upper roll having pressure ribs 23 adapted to compress the sheet rubber in the spaces between the ribs 21. The molding ribs 21 are arranged parallel to each other along the length of the roll 20, and, as shown, preferably have vertical side faces 24 and transversely curved outer surfaces 25 adapted to shape an approximately U-shaped trough or channel in the rubber. The pressure ribs 23 on the other roll are adapted to engage the sheet in the spaces between the ribs 21 at points adjacent the bases of said ribs and to press the rubber against the surface of the roll 20. The ribs 23 are preferably narrower than the ribs 21 and have parallel side faces and cylindrical peripheral portions opposing those cylindrical portions of lower roll 20 which are intermediate the molding ribs 21.

It will be observed that when no rubber is passing through the machine the ribs 23 of the upper roll will be pressed into contact with the opposing surfaces of the lower roll, and that when rubber is passing through the machine, as shown in Fig. 3, said ribs 23 will subject the rubber to pressure along narrow parallel lines, but will clear the rubber being formed over the molding ribs 21 so that except for said narrow pressure lines the rubber will not be confined by the upper roll.

In the form shown, the diameter of the lower roll intermediate the molding ribs 21 is the same as the diameter of the pressure ribs 23. In this case the two rolls are geared together by means of meshing gears $20^a$ and $22^a$, respectively, having the same number of teeth. Thus the opposed portions of the rolls which exert pressure against the rubber along the narrow parallel lines have the same surface speed. The same result can be obtained in cases where the cooperating pressure portions are of different diameters by providing the intermeshing gears on the two rolls with the proper number of teeth.

It will be understood that the rolls are rotated by any suitable means, such as a pulley 26 on the shaft of roll 20 and a driving belt 27 engaging said pulley. This driving mechanism is, however, shown merely by way of example.

For creating the desired amount of pressure on the material as it passes between the two rolls, any suitable or preferred means may be employed. In the drawings I have shown by way of example screws 28 acting on movable bearings of the upper roll 22 to force the upper roll toward the lower roll. By turning these screws the pressure can be regulated as desired.

In operating the apparatus shown in Fig. 1, the rolls are adjusted to give the requisite pressure, and while they are in rotation a thin flexible sheet of unvulcanized rubber is passed through the bite of the rolls. In Fig. 3, which is on a scale many times larger than actual size, the effect of the rolls is shown, and it will be observed from this view how the trough-shaped or channel-shaped parallel portions are molded about the curved outer surfaces of the molding ribs 21, while concurrently the material of the sheet is compressed and reduced in thickness in the spaces between said molding ribs, the material being free except in those zones engaged by the outer faces of the compressing ribs 23. As a result of the molding of the channel-shaped projections about the lower roll, those portions of the sheet which are at the summits or intermediate parts of the channel-shaped projections are of greater length than those against which the ribs 23 press (parts 21 being of greater radius at their peripheries), and consequently when the sheet has passed through the rolls, the channel-shaped portions thereof will draw or pucker so as to create protuberances projecting from one face of the sheet alternating with depressions at that same face of the sheet.

Figure 11:
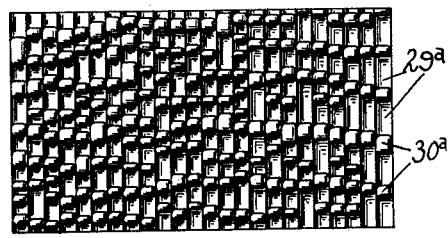

After the sheet has been passed through the rolls 20, 22, its upper surface will have an appearance such as shown in Fig. 10, while its lower surface will have an appearance such as shown in Fig. 11. In Fig. 10 the upward projections or protuberances of the channel portions are shown at 29, and the alternating depressions in the same channel portions which are caused as a result of drawing or puckering are shown at 30. Upon the opposite face of the sheet the portions coinciding with the protuberances 29 are depressions, as shown at 29ª, and those portions coinciding or in registry with the depressions 30 appear as protuberances 30ª.

Figure 12:
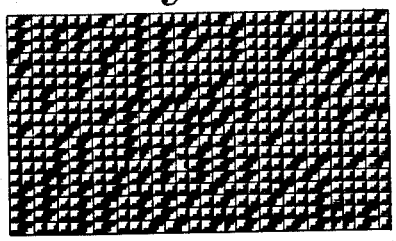
Figure 13:
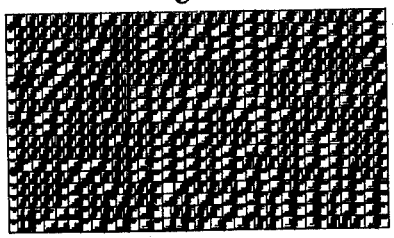

In case further crinkling is desired, the sheet after its passage through the rolls is passed again through the rolls in a direction at right angles to the first direction, and usually before passing through the rolls a second time the sheet is reversed so that that surface which was initially uppermost is placed lowermost. The result of these operations is the subdivision of the protuberances and depressions formed in the first pass, and the upper surface of the sheet will then have an appearance such as shown in Fig. 12, while the lower surface of the sheet will have an appearance such as shown in Fig. 13.

In the form of apparatus shown in Figs. 4, 5 and 6, a pair of rolls is employed which is similar in character to the rolls first described, although in this case the rolls are so formed as to produce lines of alternating protuberances and depressions which run on the bias with respect to the sheet. For this purpose the ribs on the rolls are inclined to the roll axes, or, in other words, obliquely disposed. In this case the rolls are in constant mesh, as before, and the action upon the stock is substantially the same as that hereinbefore described. In Figs. 4, 5 and 6, the pressure ribs 31 of the upper roll 22ᵇ have substantially the same cross-section as the pressure ribs 23, and the molding ribs 32 of the lower roll 20ᵇ are substantially the same in cross-section as ribs 21, but the ribs 31, 32 are arranged in this particular case at an angle of approximately 45° to the respective roll axes. In this case, also, a further distinction exists in the fact that the inclined ribs are parts of continuous helices upon the respective roll surfaces.

Figure 14:
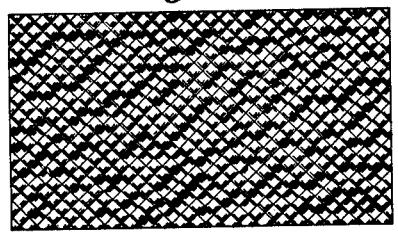
Figure 15:
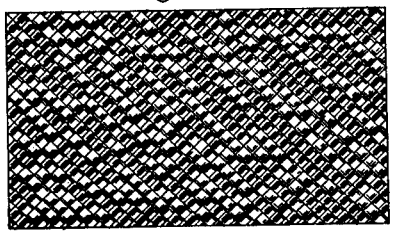

In Figs. 7 and 8 I have shown a tandem arrangement of helically ribbed rolls which can be used for the crinkling of long sheets of material in a continuous process. There are two pairs of rolls 20ᵇ, 22ᵇ, and in the first pair the roll 22ᵇ is uppermost, whereas in the second pair the roll 22ᵇ is lowermost. It will be understood that in this case, as in the case shown in Fig. 1, the rolls are pressed together under suitable pressure and are geared together or otherwise arranged so that those portions of the respective rolls which press the fine lines into the sheet have the same surface speed, as above described. When the sheet has been passed through the first pair of helically ribbed rolls, it will have an appearance generally similar to that of the sheet shown in Figs. 10 and 11, except that the lines of protuberances and depressions will be obliquely disposed relatively to the sheet. From the first pair of rolls the sheet passes directly and continuously to and through the second pair, and in this second pair the roll 22ᵇ will impinge upon the lower surface of the sheet instead of upon the upper surface thereof. The upper surface of the sheet will then (as a result of these two rollings) have an appearance such as shown in Fig. 14, while the lower surface of the sheet will have an appearance such as shown in Fig. 15.

Figure 16:
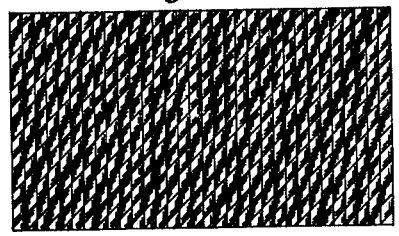
Figure 17:
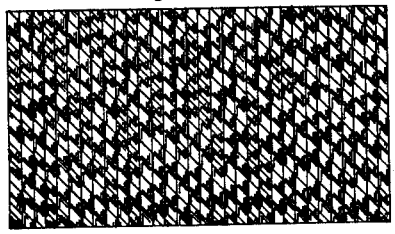

In Fig. 9 I have shown diagrammatically in plan another form of apparatus comprising two pairs of rolls arranged in tandem, the first pair of rolls being of the kind shown in Fig. 1, and the second pair being of the kind shown in Fig. 4. In other words, the rolls of the first pair have right-angularly disposed ribs, while the rolls of the second pair have obliquely disposed ribs. By the use of such an apparatus the rolls of the first pair press a plurality of fine lines upon the sheet in a direction parallel to its length, and the rolls of the second pair impress a series of oblique or diagonal lines. In between these fine lines the material of the sheet is molded and crinkled in the manner previously described. After the sheet has passed through both pairs of rolls, its upper surface will have an appearance such as shown in Fig. 16, and its lower surface an appearance such as shown in Fig. 17.

Rolls such as here described can be readily formed by grooving the surfaces of suitable cylindrical rolls of the proper size. The pressure ribs 23 are of very simple form, being of somewhat elongated rectangular shape in cross-section, and the grooves between these ribs are of approximately square cross-section. The ribs 21 are also of simple form and the grooves between them are for the most part of rectangular cross-section. It is apparent, of course, that the pressure ribs may, if desired, be placed upon the lower roll and the molding ribs upon the upper roll, although I prefer the arrangement shown.

After crinkling, the sheets are cut and formed into bathing caps and the like and vulcanized.

Various changes can be made in the detailed procedure and in the details of the apparatus without departing from the scope of my invention as defined in the claims.

What I claim is:

1. The method of ornamenting sheet rubber which comprises confining the unvulcanized material along lines which are parallel to each other, molding the material in an unconfined state between the lines to form a plurality of raised portions and stretching the raised portions in a longitudinal direction.

2. The method of ornamenting sheet rubber which comprises confining the unvulcanized material along lines which are parallel to each other, molding the material between the lines to form projecting portions of inverted channel shape and stretching said last-named portions longitudinally of said channels.

3. The method of ornamenting sheet rubber which comprises confining the unvulcanized material along continuous lines which are parallel to each other, and molding the material between the lines to form projecting portions of inverted channel shape which are longer at their outer portions than at their bases.

4. The method of ornamenting sheet rubber which comprises molding in the sheet a plurality of channel-shaped portions which are shorter at their bases than at their intermediate parts.

5. The method of ornamenting sheet rubber by crinkling it which comprises molding a plurality of channel-shaped portions in the sheet and causing the material of the sheet to be relatively shorter along the bases of the channel-shaped portions.

6. The method of ornamenting sheet rubber which comprises stretching the material of the sheet about continuous projecting rib forms to mold substantially U-shaped channels therein while confining the material along the bases of the channels to effect a lengthening of the material along the intermediate portions of the channels with respect to the bases thereof.

7. The method of ornamenting sheet rubber which comprises confining the material of the sheet along parallel lines and stretching the material between said lines about continuous projecting forms to mold substantially U-shaped channels therein running lengthwise of the sheet and having relatively short bases as compared to the portions between the bases.

8. The method of crinkling sheet rubber which comprises forming portions of the sheet over an arcuate ribbed form in order to mold it into ridges which are shorter at their bases than at their intermediate portions.

9. The method of crinkling rubber which comprises molding channel-shaped portions therein by an operation which includes the subjection of the material to pressure along the margins of the channel-shaped portions while leaving it free at the intermediate portions thereof and stretching it longitudinally of the channel-shaped portions between the margins thereof.

10. The method of crinkling rubber which comprises molding channel-shaped portions therein by an operation which includes the subjection of the material to pressure along the margins of the channel-shaped portions, such pressure being effected by cooperating rolling surfaces which travel at the same speed, and stretching the material longitudinally of the channel-shaped portions.

11. The method of ornamenting sheet rubber which comprises pressing the unvulcanized material along lines which are parallel to each other by opposed rolling surfaces having equal surface speeds, and raising the material from the plane of the sheet intermediate those lines by molding it over continuous raised arcuate molding surfaces.

12. In apparatus for ornamenting sheet rubber, a pair of cooperating rolls having continuous coacting portions which compress the unvulcanized material along lines which are parallel to each other, and other coacting portions which cause the material to be molded between the lines said first named coacting portions having substantially equal surface speeds.

13. In apparatus for ornamenting sheet rubber, a pair of cooperating rolls having continuous coacting portions of equal surface speed which compress the unvulcanized material along lines which are parallel to each other, one of said rolls having a plurality of molding ribs between said coacting portions which cause the material to be molded in channel shape.

14. In apparatus for ornamenting sheet rubber, a pair of cooperating rolls having coacting portions of equal surface speed which compress the unvulcanized material along lines which are parallel to each other, one of said rolls having a plurality of molding ribs which cause the material to be molded in channel shape, and the other of said rolls having grooves to receive said ribs with clearance therebetween.

15. In apparatus for ornamenting sheet rubber, a pair of cooperating rolls, one of said rolls having a plurality of projecting molding ribs, and the other roll having a plurality of compressing ribs to exert pressure upon the material in the spaces between the molding ribs, and the compressing ribs being of greater height than the molding ribs.

16. In apparatus for ornamenting sheet rubber, a pair of cooperating rolls, one of said rolls having a plurality of projecting molding ribs, and the other roll having a plurality of compressing ribs to exert pressure upon the material in the spaces between the molding ribs, said molding ribs having outer surfaces which are curved in transverse planes so as to form U-shaped channels in the sheet, and being of lesser height than the compressing ribs.

17. In apparatus for ornamenting sheet rubber, a pair of cooperating rolls, one of said rolls having a plurality of projecting molding ribs, and the other roll having a plurality of compressing ribs to exert pressure upon the material in the spaces between the molding ribs, said molding ribs having outer surfaces which are curved in transverse planes so as to form U-shaped channels in the sheet, and said compressing ribs being separated by rectangular grooves which provide clearance for the rubber being molded over the molding ribs.

18. In apparatus for ornamenting sheet rubber, a pair of cooperating rolls, one of said rolls having a plurality of projecting molding ribs, and the other roll having a plurality of compressing ribs to exert pressure upon the material in the spaces between the molding ribs, said molding ribs having outer surfaces which are curved in transverse planes so as to form U-shaped channels in the sheet, and said compressing ribs being separated by rectangular grooves which provide clearance for the rubber being molded over the molding ribs, and means for rotating said rolls so that the outer surfaces of the compressing ribs and the opposed portions of the other roll have substantially equal surface speeds.

19. In apparatus for crinkling sheet rubber, a pair of rolls, each of said rolls having ribs, the ribs of one roll entering the spaces between the ribs of the other roll, one set of such ribs having substantially cylindrical outer surfaces for pressing the rubber against the other roll, and the other set of ribs being shaped to mold channel-shaped projections in the rubber.

20. Apparatus for crinkling sheet rubber comprising a pair of rolls, both of said rolls having series of ribs upon the surface thereof, the ribs of one roll extending into the spaces between the ribs of the other roll, the top surfaces of the ribs of one roll contacting with the other roll, and the top surfaces of the ribs of such other roll being spaced from the first roll so as to clear the same.

21. Apparatus for ornamenting the surface of sheet rubber comprising a plurality of pairs of crinkling rolls through which the sheet passes in a continuous operation, said sets of rolls being adapted to impress the sheet with series of lines which intersect each other, each of the rolls of each pair being provided with a plurality of ribs which act upon the surface of the sheet.

22. Apparatus for ornamenting the surface of sheet rubber comprising a plurality of pairs of crinkling rolls through which the sheet passes in a continuous operation, each roll of each pair being provided with ribs which act upon the surface of the sheet and are obliquely disposed, and the ribs of one pair being disposed at an angle different from that of the ribs of another pair.

23. Apparatus for ornamenting the surface of sheet rubber comprising a plurality of pairs of crinkling rolls through which the sheet passes in a continuous operation, each roll of each pair being provided with ribs which act upon the surface of the sheet and are obliquely disposed, certain of said ribs being molding ribs and others being compressing ribs, the last named ribs being in closer contact with the cooperating roll surface than the molding ribs.

24. Apparatus for ornamenting the surface of sheet rubber comprising a plurality of pairs of crinkling rolls through which the sheet passes in a continuous operation, said sets of rolls being adapted to impress the sheet with series of lines which intersect each other, one roll of each pair being provided with molding ribs and the other roll being provided with compressing ribs.

25. The method of ornamenting sheet rubber which comprises rolling the unvulcanized material along parallel lines to confine it along those lines, and concurrently molding and stretching longitudinally the material between the lines to form portions therein which will pucker.

26. The method of ornamenting sheet rubber which comprises confining the material of the sheet to produce short portions therein spaced from each other, and longitudinally stretching and molding the sheet in between the short portions to produce long portions which will pucker.

27. The method of ornamenting sheet rubber which comprises pressing the unvulcanized material upon an arcuate ribbed form to form inverted channel-shaped portions in the sheet, said pressing being effected by a cooperating rolling surface confining the material between the ribs and causing it to conform to the shape of said ribbed form.

WALTER R. WEEKS.